(12) United States Patent
Kusumoto et al.

(10) Patent No.: US 6,979,516 B2
(45) Date of Patent: Dec. 27, 2005

(54) LITHIUM SECONDARY BATTERY AND POSITIVE ELECTRODE FOR LITHIUM SECONDARY BATTERY

(75) Inventors: Yasuyuki Kusumoto, Moriguchi (JP); Masahisa Fujimoto, Osaka (JP); Shin Fujitani, Hirakata (JP); Yoichi Domoto, Ikoma (JP); Daizo Jito, Hirakata (JP); Hisaki Tarui, Shijyonawate (JP)

(73) Assignee: Sanyo Electric Co., Ltd., Osaka (JP)

( * ) Notice: Subject to any disclaimer, the term of this patent is extended or adjusted under 35 U.S.C. 154(b) by 476 days.

(21) Appl. No.: 10/056,209

(22) Filed: Jan. 28, 2002

(65) Prior Publication Data

US 2002/0168571 A1 Nov. 14, 2002

(30) Foreign Application Priority Data

Jan. 29, 2001 (JP) .............................. 2001-019978
Jun. 27, 2001 (JP) .............................. 2001-194983

(51) Int. Cl.[7] .................. H01M 4/36; H01M 4/52; H01M 4/58; C23C 14/00; C23C 14/32
(52) U.S. Cl. ................. 429/221; 204/192.15
(58) Field of Search .................. 429/221; 204/192.15

(56) References Cited

U.S. PATENT DOCUMENTS 5,955,220 A * 9/1999 Takada et al. ............... 429/221
6,190,803 B1 * 2/2001 Tomiyama et al. .......... 429/245

OTHER PUBLICATIONS

Abraham, K.M. et al.; "Preparation and Characterization of Some Lithium Insertion Anodes for Secondary Lithium Batteries"; *J. Electrochem. Soc.*; vol. 137, No. 3, pp. 743-749; 1990.
Morzilli, S. et al.; "Iron Oxide Electrodes in Lithium Organic Electrolyte Rechargeable Batteries"; *Electrochimica Acta*; vol. 30, No. 10, pp. 1271-1276; 1985.
Pernet, M. et al.; "Structural and Electrochemical Study of Lithium Insertion into y-$Fe_2O_3$"; *Solid State Ionics*; vol. 66, pp. 259-265; 1993.
Chen, C.J. et al.; "Lithium Insertion into Spinel Ferrites"; *Solid State Ioinics*; vol. 18 & 19, pp. 838-846; 1986.
Islam, M.S. et al.; "Lithium Insertion into $Fe_3O_4$"; *Journal of Solid State Chemistry*; vol. 77, pp. 180-189; 1988.
Ito, S. et al.; "$K^+$-$\beta$-Ferrite as a New Cathode Active Material for Lithium Secondary Battery"; *J. Phys. IV France*; vol. 7, pp. C1-161—C1-162; 1997.
Ito, S. et al.; "Lithium Secondary Battery Using Potassium-$\beta$-Ferrite as a New Cathode Active Material"; *Solid State Ionics*; vol. 113-115, pp. 17-21; 1998.
Ito, S. et al.; "Preparation and Properties of Lithium Inserted $K^+$-$\beta$-Ferrite"; *Solid State Ionics*; vol. 113-115, pp. 23-27; 1998.
Zotti, G. et al.; "Electrodeposition of Amorphous $Fe_2O_3$ Films by Reduction of Iron Perchlorate in Acetonitrile" *J. Electrochem. Soc.*; vol. 145, No. 2, pp. 385-389; 1998.
Sarradin, J. et al.; "Study of $Fe_2O_3$-based thin film electrodes for lithium-ion batteries"; *Solid State Ionics*; vol. 112, pp. 35-40; 1998.
Ribes, M. et al.; "Thin films on amorphous electrode materials for Li Microbatteries"; *Proceedings of the Symposium on Thin Film Solid Ionic Devices and Materials, Electrochemical Society Proceedings*, vol. 95-22, pp. 164-172; 1996.

* cited by examiner

Primary Examiner—Patrick Joseph Ryan
Assistant Examiner—Julian Mercado
(74) Attorney, Agent, or Firm—Kubovcik & Kubovcik (57) ABSTRACT

A lithium secondary battery comprises a negative electrode containing lithium metal or a material previously storing lithium as an active material, a positive electrode containing a positive active material, and an electrolyte containing a non-aqueous electrolyte solution. The positive active material is a thin film formed by depositing on a substrate from vapor phase or liquid phase and including an oxide containing at least iron as a main constituent by a sputtering method, a reactive deposition method, a vacuum deposition method, a chemical vapor deposition method, a spraying method, a plating method, or a method in combination of these methods.

17 Claims, 13 Drawing Sheets

LITHIUM SECONDARY BATTERY AND POSITIVE ELECTRODE FOR LITHIUM SECONDARY BATTERY

BACKGROUND OF THE INVENTION

1. Field of the Invention

The present invention relates to a lithium secondary battery and a positive electrode of the lithium secondary battery.

2. Related Art

In recent years, a lithium secondary battery referred to as a lithium ion battery has widely been used for power sources of cellular phones and personal computers. Generally, a lithium secondary battery which has recently practically been used has a weight energy density of about 150 Wh/kg and is required to further densify weight energy density.

The lithium secondary battery in practical use employs a carbon-based material such as graphite for the negative electrode, a lithium-containing oxide such as $LiCoO_2$ for the positive electrode, and an organic solvent, for example, cyclic carbonate such as ethylene carbonate, a chain carbonate such as dimethyl carbonate and the like, in which an electrolyte salt such as $LiPF_6$ is dissolved, for the electrolyte solution. In such kind of lithium secondary battery, since lithium ion moves between the positive electrode and the negative electrode during charge and discharge, the energy density is determined depending on the specific capacity of positive electrode, the specific capacity of negative electrode, and the battery voltage.

The actual specific capacity of the carbon-based material to be employed for a negative electrode is 370 mAh/g in the case of the graphite which has the highest specific capacity and the actual specific capacity of $LiCoO_2$, which is generally employed for a positive electrode, is about 150 mAh/g. As described above, comparing actual specific capacity between the positive electrode and the negative electrode, the capacity of the negative electrode is at least two times as high as that of the positive electrode and it is found effective to increase the actual specific capacity of the positive electrode rather than that of the negative electrode in order to increase the weight energy density of the battery.

However, a lithium-containing oxide such as $LiCoO_2$ is known as a material whose crystal structure is broken and whose charge-discharge cycle characteristics are considerably deteriorated if Li is completely pulled out. Consequently, it is difficult to increase the actual specific capacity of the positive electrode using such as Li-containing oxide. Further, since cobalt reserves are in small amounts and thus cobalt is expensive, a positive electrode material in place of that is required.

SUMMARY OF THE INVENTION

An object of the present invention is to provide a lithium secondary battery and a positive electrode for a lithium secondary battery having a high discharge capacity and excellent in charge-discharge cycle characteristics.

The lithium secondary battery of the present invention is a lithium secondary battery provided with a negative electrode containing lithium metal or a material previously storing lithium as an active material, a positive electrode containing a positive active material, and an electrolyte containing a non-aqueous electrolyte solution, wherein the positive active material is a thin film formed by depositing on a substrate from vapor phase or liquid and including an oxide containing at least iron as a main constituent.

The oxide containing iron is exemplified by $Fe_2O_3$, $Fe_3O_4$ and the like and the thin film preferably contains a crystal thereof. Further, as the thin film, those having columnar structure extended substantially in the vertical direction to a substrate are preferable in terms of improvement of the charge-discharge cycle characteristics. Although the detailed reasons are not made clear, it is supposed that due to the columnar structure, the expansion and contraction of the positive active material during charge and discharge take place in the thickness direction and as a result, even if the charge-discharge cycles are repeated, the structure of the entire thin film becomes difficult to be broken and decrease of the capacity becomes slight.

The oxide containing iron may contain other elements. For example, the oxide containing iron may contain potassium. Examples of such compound containing iron and potassium are $K_{1.4}Fe_{11}O_{17}$ and the like. These ferrite materials are the materials conventionally studied as a positive electrode material of a lithium secondary battery. Conventionally, these materials have been used for manufacturing an electrode by mixing the material in powdery state with a binder and a conductive material and molding or applying the resulting mixture on a current collector.

In the present invention, the thin film including the above-described oxide containing at least iron as a main constituent is formed by depositing on a substrate from vapor phase or liquid phase. Such a film-forming method is exemplified by a sputtering method, a reactive deposition method, a vacuum deposition method, a chemical vapor deposition (CVD) method, a spraying method, a plating method, and a method in combination of these methods.

In the present invention, the oxide containing at least iron to be employed as an active material may contain potassium as described above. Further, potassium may have a concentration distributed in the thickness direction and the distribution is preferable to be gradually decreased toward the thin film surface from the interface of the substrate and the thin film. It is supposed that insertion and extraction reaction of lithium ion into and from the iron oxide is affected by the contained potassium and probably the reacting weight of lithium is decreased, so that the amounts of expansion and contraction upon the reaction is decreased. As a result, the crystal structure of the oxide is supposed to become difficult to be broken. Further, if potassium is distributed in the above-describe manner in the thickness direction, the thin film structure becomes stable near the substrate, so that the adhesion to the substrate is increased and the structure of the entire thin film becomes harder to be broken even if the charge-discharge cycles are repeated. Consequently, the decrease of the capacity can be suppressed and charge-discharge cycle characteristics are stable.

Further, the oxide containing iron and potassium may further contain carbon. The contained carbon improves the conductivity of the iron oxide thin film which is generally an insulator, so that lithium ion becomes easy to move. From such a point of view, it is assumed that the same effect is achieved by containing a conductive element or compound.

In the present invention, it is preferable to employ a substrate having electron conductivity as a substrate. Employment of the substrate having electron conductivity makes the substrate possible to function as a current collector. The substrate is preferably made of a metal or an alloy, further preferably an aluminum or an aluminum alloy. In the case of using the substrate as a current collector, its thickness is preferably thin and thus a foil made of a metal or an alloy is preferably used as the substrate.

Further, in the interface of the above-described substrate and the above-described iron oxide thin film, it is preferable for the substrate constituent and the thin film constituent to be diffused each other. Due to the diffusion of the substrate constituent and the thin film constituent, the adhesion between the thin film and the substrate is improved and an effect of suppression of the reaction of the iron oxide and lithium ion is supposed to be caused similarly to the above-described effect of containing potassium.

Examples of a method for forming an iron oxide thin film of the present invention are, as described above, various vacuum processes, a spraying method, a plating method, and a method in combination with these method. Especially, a sputtering method, a reactive deposition method, a vacuum deposition method, and a chemical vapor deposition (CVD) method are preferable. That is because the mutual diffusion of the substrate constituent and the thin film constituent is increased depending on the effect of the temperature at the time of forming thin film and because the thin film becomes easy to grow in columnar structure. Further, it makes easy to control the composition, for example, in the thickness direction by controlling the film forming conditions. Further, it also makes possible to form a mixed layer (a mutually diffused region) in the interface between the substrate and the thin film, control the crystallinity (the orientation) of the thin film, and control the growth direction (the growth promotion in the columnar direction) by forming under the conditions where ions are radiated, for example, to the thin film growth surface. As a practical method for radiating ions, there are a method for radiating ion beam of such as Ar and oxygen while the deposition materials reach the substrate surface, and a method for attracting ions such as Ar and oxygen by applying practically negative voltage to the substrate to collide the ion against the substrate.

The positive electrode for a lithium secondary battery of the present invention is a positive electrode for a lithium secondary battery formed by depositing a thin film of the active material on a current collector from vapor phase or liquid phase and characterized in that the thin film of the active material contains an oxide containing at least iron as a main constituent.

The positive electrode for a lithium secondary battery of the present invention is similar to the positive electrode to be employed for the above-described lithium secondary battery of the present invention.

The negative electrode to be employed for the lithium secondary battery of the present invention is not particularly restricted if it can be employed as a negative electrode of a lithium secondary battery and it contains lithium metal or a material previously storing lithium as an active material. Examples of the material previously storing lithium are carbon-based materials previously storing lithium and alloys previously storing lithium. Examples of the alloys are alloys of lithium with silicon, aluminum, tin, germanium, indium, or magnesium.

The electrolyte to be employed for the lithium secondary battery of the present invention is an electrolyte containing a non-aqueous electrolyte solution. The solvent of the non-aqueous electrolyte solution is not particularly restricted and examples thereof are mixed solvents of cyclic carbonates such as ethylene carbonate, propylene carbonate, and butylene carbonate and chain carbonates such as dimethyl carbonate, methyl ethyl carbonate, and diethyl carbonate. Further, examples include mixed solvents of the above-described cyclic carbonates with ether type solvents such as 1,2-dimethoxyethane, 1,2-diethoxyethane and the like. Further, examples of the solute of the non-aqueous electrolyte solution are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ or the like and their mixtures. Further, a gel polymer electrolyte may be employed as the electrolyte, which is prepared by impregnating a polymer electrolyte such as polyethylene oxide, polyacrylonitrile, and polyfluorovinylidene with an electrolyte solution.

DESCRIPTION OF PREFERRED EXAMPLES

Hereinafter, the present invention will be described in details based on examples, however, the invention is not restricted to the following examples at all and any modifications or proper embodiments are possible within the scope of the present invention.

(Experiment 1)

[Production of Positive Electrode]

A thin film was formed on an aluminum foil (the thickness of 20 $\mu$m) using a target of $K_{1.33}Fe_{11}O_{17}$ by RF sputtering method. The film forming conditions were shown in Table 1.

As the target shown in Table 1, those with a diameter of 10.2 cm (4 inch) and a thickness of 5 mm were employed. As the carbon chips put on the targets, those with a diameter of 10 mm and a thickness of 1 mm, and as the iron chips, those with 10 mm square and a thickness of 1 mm were employed in the number shown in Table 1, respectively. As the carbon chips, pellets made from powdery graphite were employed. As the iron chips, iron plates with the above-described shapes were employed.

TABLE 1

|  | target | chip | loaded electric power | sputtering gas flow rate Ar | sputtering gas flow rate $O_2$ |
|---|---|---|---|---|---|
| Ex. 1 | $K_{1.33}Fe_{11}O_{17}$ | none | 350 W | 100 sccm | 0 sccm |
| Ex. 2 | $K_{1.33}Fe_{11}O_{17}$ | 3 carbon chips | 350 W | 100 sccm | 0 sccm |
| Ex. 3 | $K_{1.33}Fe_{11}O_{17}$ | 8 carbon chips | 350 W | 100 sccm | 5 sccm |
| Ex. 4 | $K_{1.33}Fe_{11}O_{17}$ | 8 iron chips | 350 W | 100 sccm | 5 sccm |

The resulting aluminum foils on which the above-described thin films were formed were cut in 20 mm square to obtain electrodes of Examples 1 to 4.

As an electrode of Comparative Example 1, a pellet electrode was produced from powder of $K_{1.4}Fe_{11}O_{17}$. Specifically, 40 parts by weight of $K_{1.4}Fe_{11}O_{17}$ powder, 40 parts by weight of acetylene black as a conductive agent, and 20 parts by weight of polytetrafluoroethylene as a binder were mixed, the mixture was pressured to form into a shape with a diameter of 16 mm and a thickness of 0.1 mm, and then vacuum drying was conducted at 110° C. to produce the pellet electrode.

[Preparation of Electrolyte Solution]

To a mixed solvent of ethylene carbonate (EC) and dimethyl carbonate (DMC) by a volume ratio of 1:1, $LiPF_6$ was dissolved by a ratio of 1.0 mole/L to produce an electrolyte solution.

[Production of Beaker Cell]

The above-described positive electrodes were employed as work electrodes, those produced by molding lithium metal were employed as counter electrodes and reference electrodes, and the above-described electrolyte solution was employed as an electrolyte, to produce beaker cells.

[Charge-Discharge Cycle Test]

The charge-discharge cycle test was carried out in the following conditions for each beaker cell of the above-described Examples 1 to 4 and the Comparative Example 1.

(1) Charge Discharge Conditions of the Examples 1 to 4

The discharge current was set as follows: 2.0 mA at the first cycle; 1.0 mA at the second cycle; and 0.5 mA at the third cycle and the following cycles. The discharge end voltage was set 0.5 V (the potential of the work electrode relative to the reference electrode).

The charge current was set as follows: 2.0 mA at the first cycle; 1.0 mA at the second cycle; and 0.5 mA at the third cycle and the following cycles. The charge end voltage was set 4.0 V (the potential of the work electrode relative to the reference electrode).

(2) Charge-discharge Conditions of the Comparative Example 1

The discharge current was set to be 2.0 mA and the discharge end voltage was set to be 0.5 V (the potential of the work electrode relative to the reference electrode)

The charge current was set to be 2.0 mA and the charge end voltage was set to be 4.0 V (the potential of the work electrode relative to the reference electrode).

Figure 1:
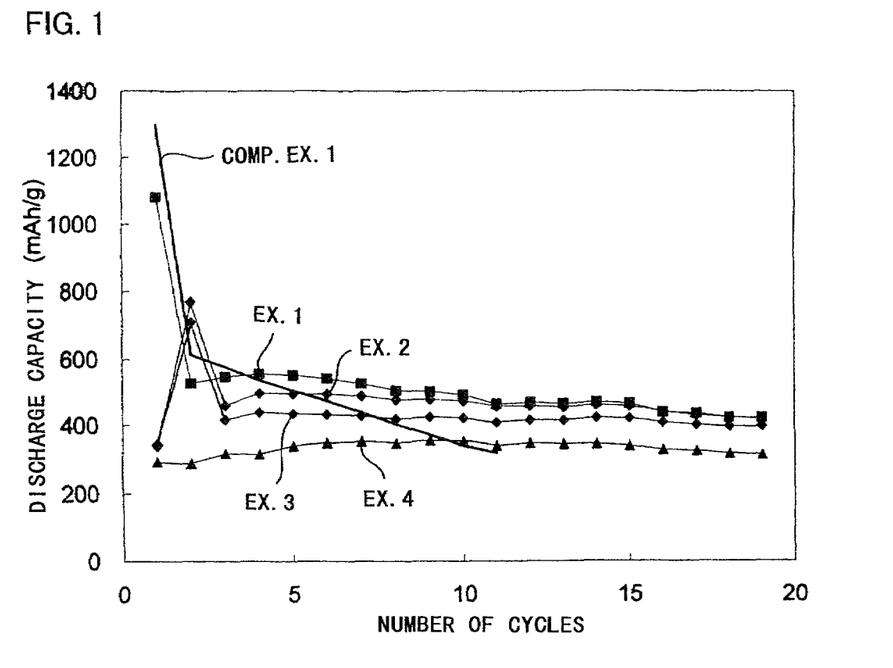
FIG. 1 is a graph showing the relation between the charge-discharge cycle and the discharge capacity in the examples of the present invention.

FIG. 1 shows the relation of the number of cycles and the discharge capacity of Examples 1 to 4 and Comparative Example 1. As apparent from FIG. 1, in Examples 1 to 4 in which the electrodes were produced by a sputtering method, decrease of the capacity was slight even if the charge-discharge cycles were repeated. On the other hand, in Comparative Example 1 in which the electrode was produced from the powder, it is found that the discharge capacity was greatly decreased due to the repetition of the charge-discharge cycles.

Table 2 shows the discharge capacity of the third cycle and the 11th cycle and the capacity retention rate of the 11th cycle. The capacity retention rate of the 11th cycle were the values calculated from the following formula:

Capacity retention rate (%) of the 11th cycle=(the discharge capacity of the 11th cycle/the discharge capacity of the third cycle)×100.

TABLE 2

|  | discharge capacity of third cycle (mAh/g) | discharge capacity of 11th cycle (mAh/g) | capacity retention rate of 11th cycle |
|---|---|---|---|
| Ex. 1 | 547.4 | 463.5 | 84.7% |
| Ex. 2 | 460.0 | 457.6 | 99.5% |
| Ex. 3 | 417.9 | 409.4 | 98.0% |
| Ex. 4 | 318.5 | 342.2 | 107.4% |
| Comp. Ex. 1 | 578.6 | 320.2 | 55.3% |

As apparent from Table 2, the capacity retention rate of 11th cycle became high for Examples 2 and 3 in which the electrodes were produced by mounting a carbon chip or an iron chip on the targets, as compared with that for Example 1 in which the electrode was produced by mounting no chip on the target.

(Experiment 2)

[Production of Positive Electrode]

A thin film (a ferrite thin film) constituted of Fe and O was produced on an aluminum foil (the thickness of 20 μm) by a reactive deposition method. In the reactive deposition method, $O_2$ was introduced into a vacuum chamber and the Fe deposition material was melted and evaporated by an electron beam (EB) gun to form the ferrite thin film on the aluminum foil, i.e. a substrate (Examples 5–7).

Further, also by an ion-assisting reactive deposition method, in which simultaneously with the deposition of Fe, ion beam was radiated toward the aluminum foil, an iron oxide (ferrite) thin film was formed (Examples 8 and 9).

Table 3 shows the respective film forming conditions.

TABLE 3

| | film-forming method | deposition material | deposition speed (nm/sec.) | reactive gas $O_2$ flow rate | ion beam radiation conditions |
|---|---|---|---|---|---|
| Ex. 5 | reactive deposition method | Fe | 0.25–0.40 | 10 sccm | no radiation |
| Ex. 6 | | | 0.20–0.30 | 20 sccm | |
| Ex. 7 | | | 0.30–0.40 | 30 sccm | |
| Ex. 8 | ion beam-assisting reactive deposition method | | 0.40–0.50 | 30 sccm | Ar 4 sccm ion accelerating voltage 200 V |

TABLE 3-continued

| film-forming method | deposition material | deposition speed (nm/sec.) | reactive gas $O_2$ flow rate | ion beam radiation conditions |
|---|---|---|---|---|
| Ex. 9 | | 0.50–0.60 | 26 sccm | Ar 4 sccm $O_2$ 4 sccm ion accelerating voltage 200 V ion current 100 mA |

The resulting aluminum foils on which the above-described thin films were formed were cut in 20 mm square to obtain electrodes of Examples 5 to 9.

As an electrode of Comparative Example 2, a pellet electrode was produced from $Fe_2O_3$ powder. Specifically, 40 parts by weight of $Fe_2O_3$ powder, 40 parts by weight of acetylene black as a conductive agent, and 20 parts by weight of polytetrafluoroethylene as a binder were mixed, the mixture was pressured to form into a shape with a diameter of 16 mm and a thickness of 0.1 mm, and then vacuum drying at 110° C. was conducted to produce the pellet electrode.

[Preparation of Electrolyte Solution]

To a mixed solvent of ethylene carbonate (EC) and dimethyl carbonate (DMC) by a volume ratio of 1:1, $LiPF_6$ was dissolved by a ratio of 1.0 mole/L to produce an electrolyte solution.

[Production of Beaker Cell]

The above-described positive electrodes were employed as work electrodes, those molded by forming lithium metal were employed as counter electrodes and reference electrodes, and the above-described electrolyte solution was used as an electrolyte, to produce beaker cells.

[Charge-Discharge Cycle Test]

The charge-discharge cycle test was carried out in the following conditions for each beaker cell of the above-described Examples 5 to 9 and the Comparative Example 2.

(1) Charge-discharge Conditions of the Examples 5 to 9

The discharge current was set to be 0.5 mA and the discharge end voltage was set to be 0.5 V (the potential of the work electrode relative to the reference electrode)

The charge current was set to be 0.5 mA and the charge end voltage was set to be 3.0 V (the potential of the work electrode relative to the reference electrode).

(2) Charge-discharge Conditions of Comparative Example 2

The discharge current was set to be 2.0 mA and the discharge end voltage was set to be 0.5 V (the potential of the work electrode relative to the reference electrode).

The charge current was set to be 2.0 mA and the charge end voltage was set to be 4.0 V (the potential of the work electrode relative to the reference electrode).

Figure 2:
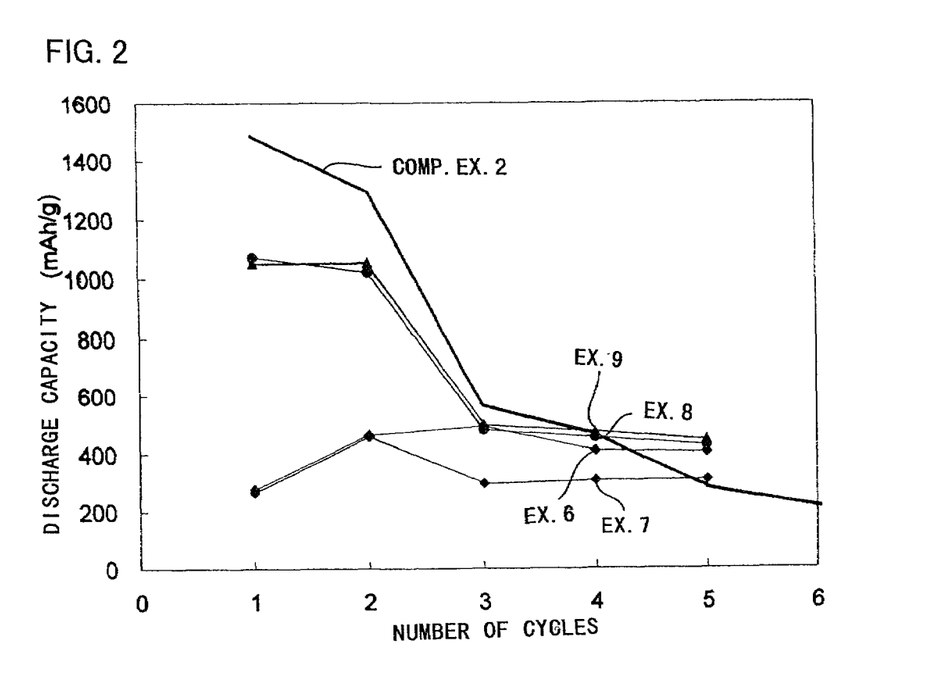
FIG. 2 is a graph showing the relation between the charge-discharge cycle and the discharge capacity in the examples of the invention.

FIG. 2 shows the relation of the number of charge-discharge cycles and the discharge capacity of Examples 6 to 9 and Comparative Example 2. As apparent from FIG. 2, in Examples 6 to 9 in which the electrodes were produced by a reactive deposition method, decrease of the capacity was slight even if the charge-discharge cycles were repeated. On the other hand, in Comparative Example 2 in which the electrode was produced from the powder, the discharge capacity was greatly decreased due to the repetition of the charge-discharge cycles.

Table 4 shows the discharge capacity of the second cycle and the fifth cycle and the capacity retention rate of fifth cycle of Examples 5 to 9 and Comparative Example 2. The capacity retention rate of the fifth cycle was the values calculated from the following formula:

Capacity retention rate (%) of fifth cycle=(the discharge capacity of the fifth cycle/the discharge capacity of the second cycle)×100.

TABLE 4

| | discharge capacity of second cycle (mAh/g) | discharge capacity of fifth cycle (mAh/g) | capacity retention rate of fifth cycle |
|---|---|---|---|
| Ex. 5 | 189.2 | 78.2 | 41.3% |
| Ex. 6 | 276.8 | 403.0 | 145.6% |
| Ex. 7 | 266.4 | 308.3 | 115.7% |
| Ex. 8 | 1071.4 | 425.0 | 39.7% |
| Ex. 9 | 1050.3 | 444.8 | 42.3% |
| Comp. Ex. 2 | 1486.5 | 280.6 | 18.9% |

As apparent from Table 4, the batteries of Examples 5 to 9 show excellent charge-discharge cycle characteristics as compared with the battery of Comparative Example 2.

Figure 3:
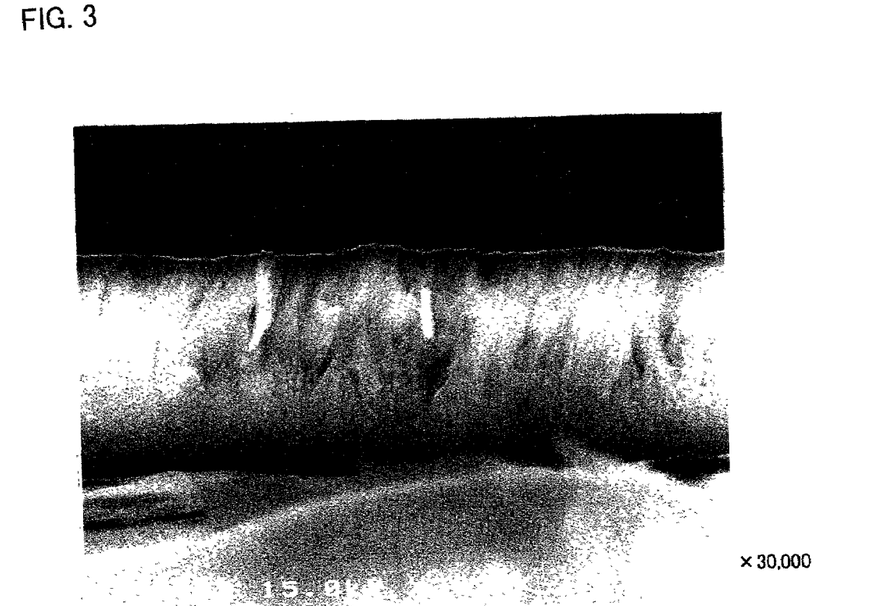
FIG. 3 is a scanning electron microscopic photograph (30,000 magnifications) of a cross-section of a thin film of an example of the present invention.
Figure 4:
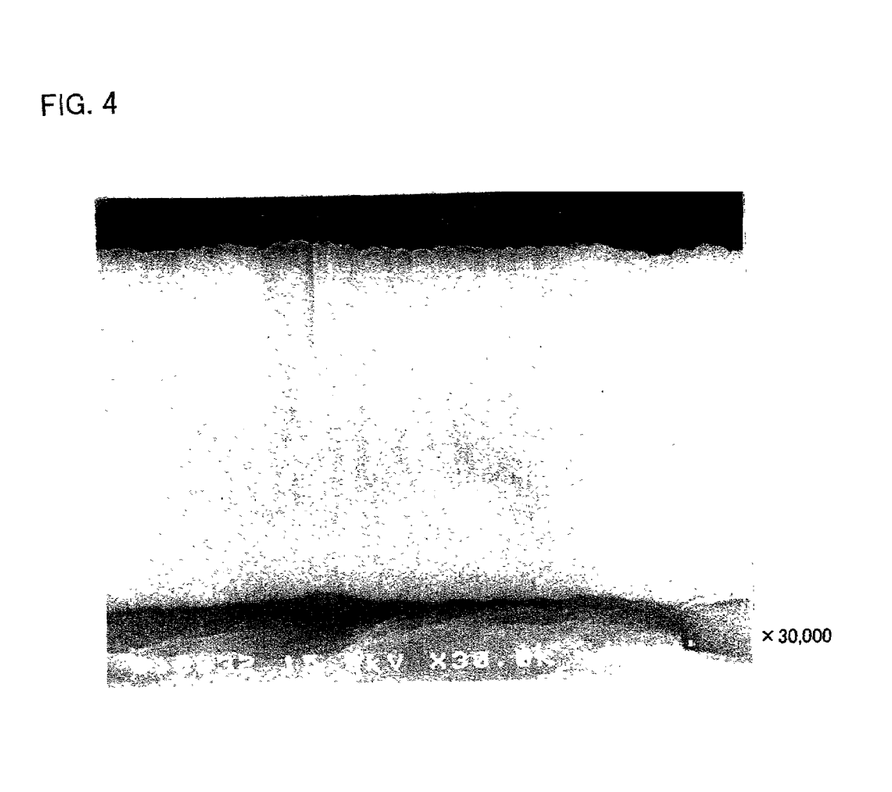
FIG. 4 is a scanning electron microscopic photograph (30,000 magnifications) of a cross-section of a thin film of an example of the present invention.
Figure 5:
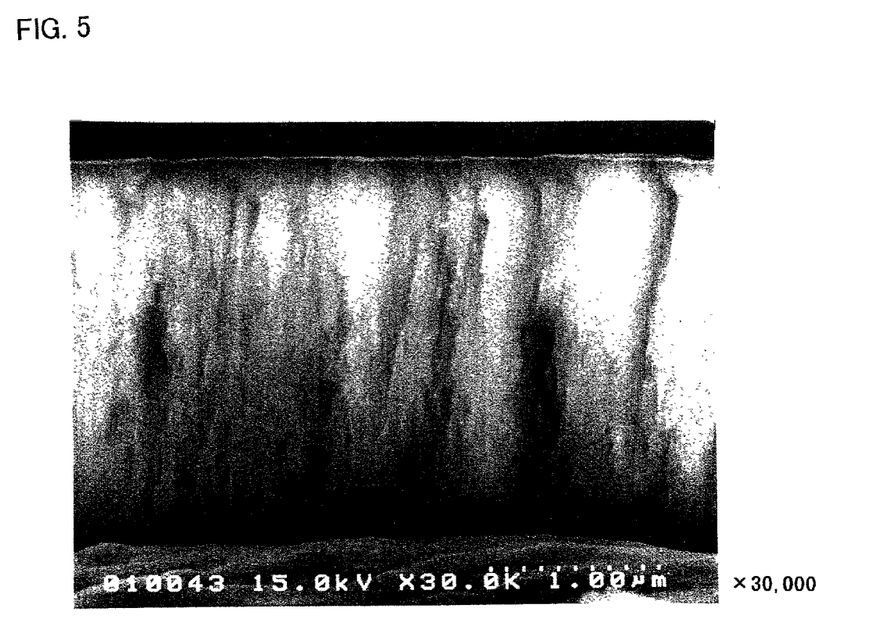
FIG. 5 is a scanning electron microscopic photograph (30,000 magnifications) of a cross-section of a thin film of an example of the present invention.

Next, the thin films produced in the experiments 1 and 2 were observed with a scanning electron microscope (SEM). The SEM photographs of the cross-sectional views of the thin films produced in Examples 1, 7 and 9 were shown in FIG. 3 (Example 1), FIG. 4 (Example 7), and FIG. 5 (Example 9), respectively. The magnification was 30,000×. In the cross-sectional views, the structure in which a crystal was grown substantially in the thickness direction was observed, and it is found that the thin films have columnar structure. Further, it is found that the thin film formed by the sputtering method (Example 1: FIG. 3) was uniform in the vicinity of the interface with the substrate and has the columnar structure only in the vicinity of the surface.

Figure 6:
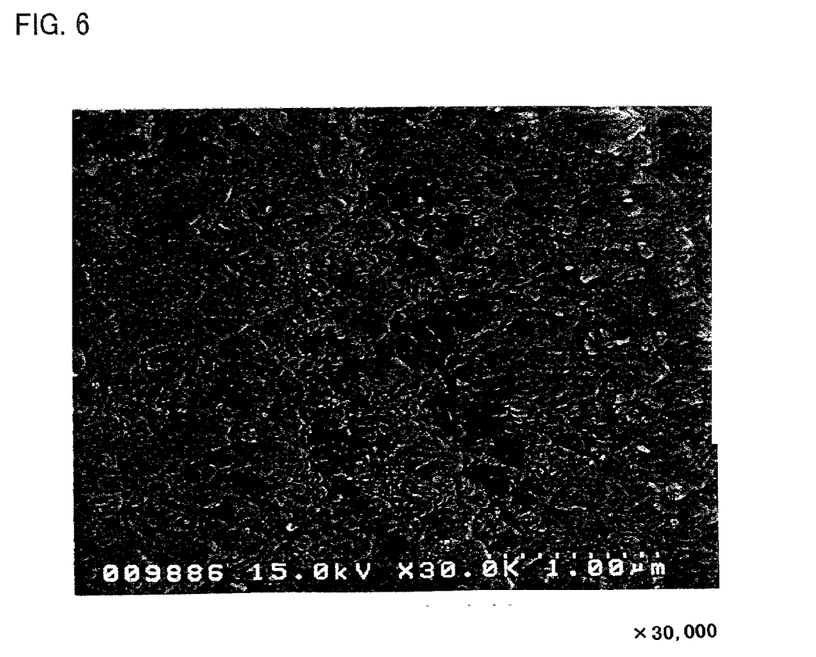
FIG. 6 is a scanning electron microscopic photograph (30,000 magnifications) of a surface of a thin film of an example of the present invention.
Figure 7:
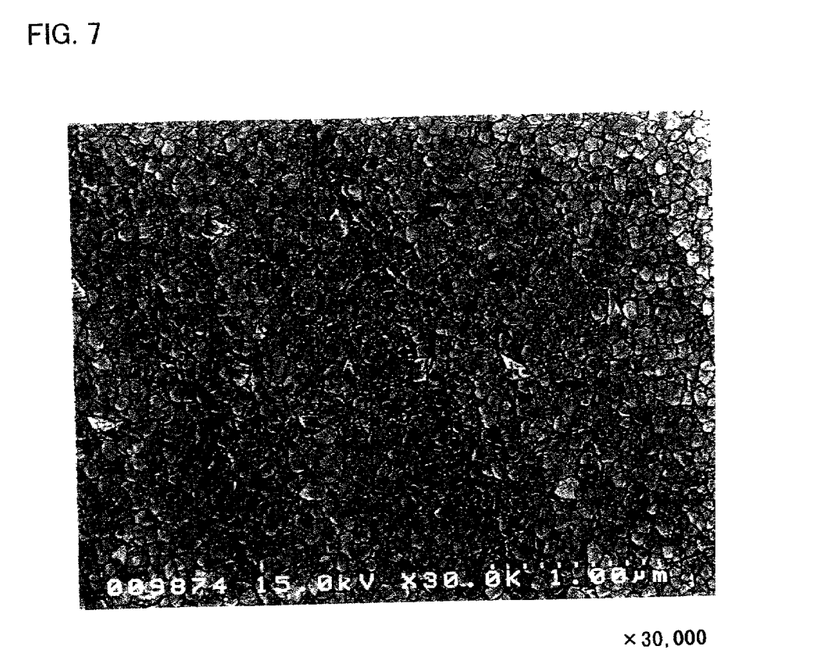
FIG. 7 is a scanning electron microscopic photograph (30,000 magnifications) of a surface of a thin film of an example of the present invention.
Figure 8:
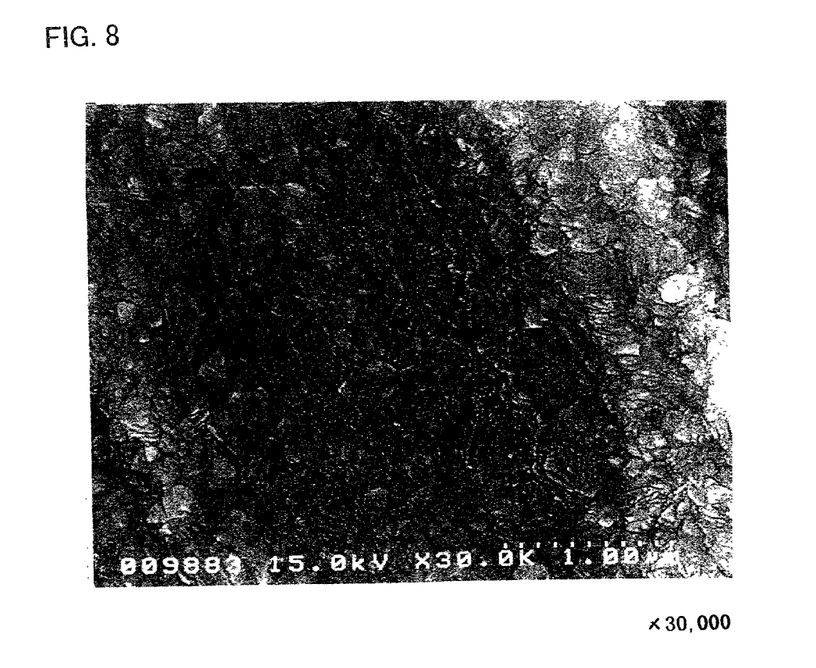
FIG. 8 is a scanning electron microscopic photograph (30,000 magnifications) of a surface of a thin film of an example of the present invention.

Further, SEM images of the surface of the thin films produced in Examples 1, 7 and 9 were also shown in FIG. 6 (Example 1), FIG. 7 (Example 7) and FIG. 8 (Example 9), respectively. The magnification was 30,000×. It is found that there is fine irregularity on the surface. Further, in the surface of the films (Example 7: FIG. 7, Example 9: FIG. 8) formed by the reactive deposition method, grain boundaries corresponding to the respective columnar structures observed in the cross-sectional views were clearly observed.

Figure 11:
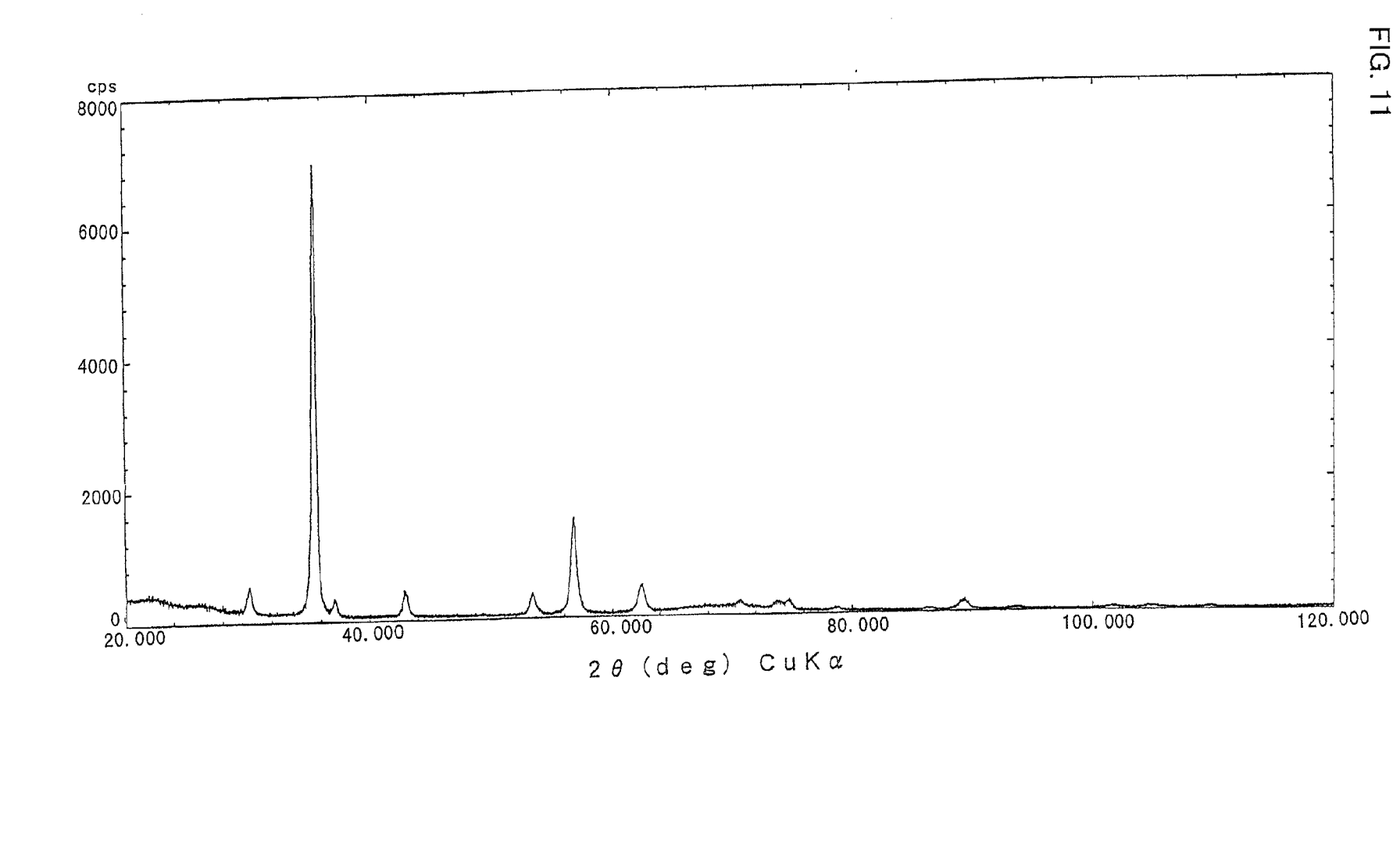
FIG. 11 is an x-ray diffraction chart of a thin film of an example of the present invention.
Figure 12:
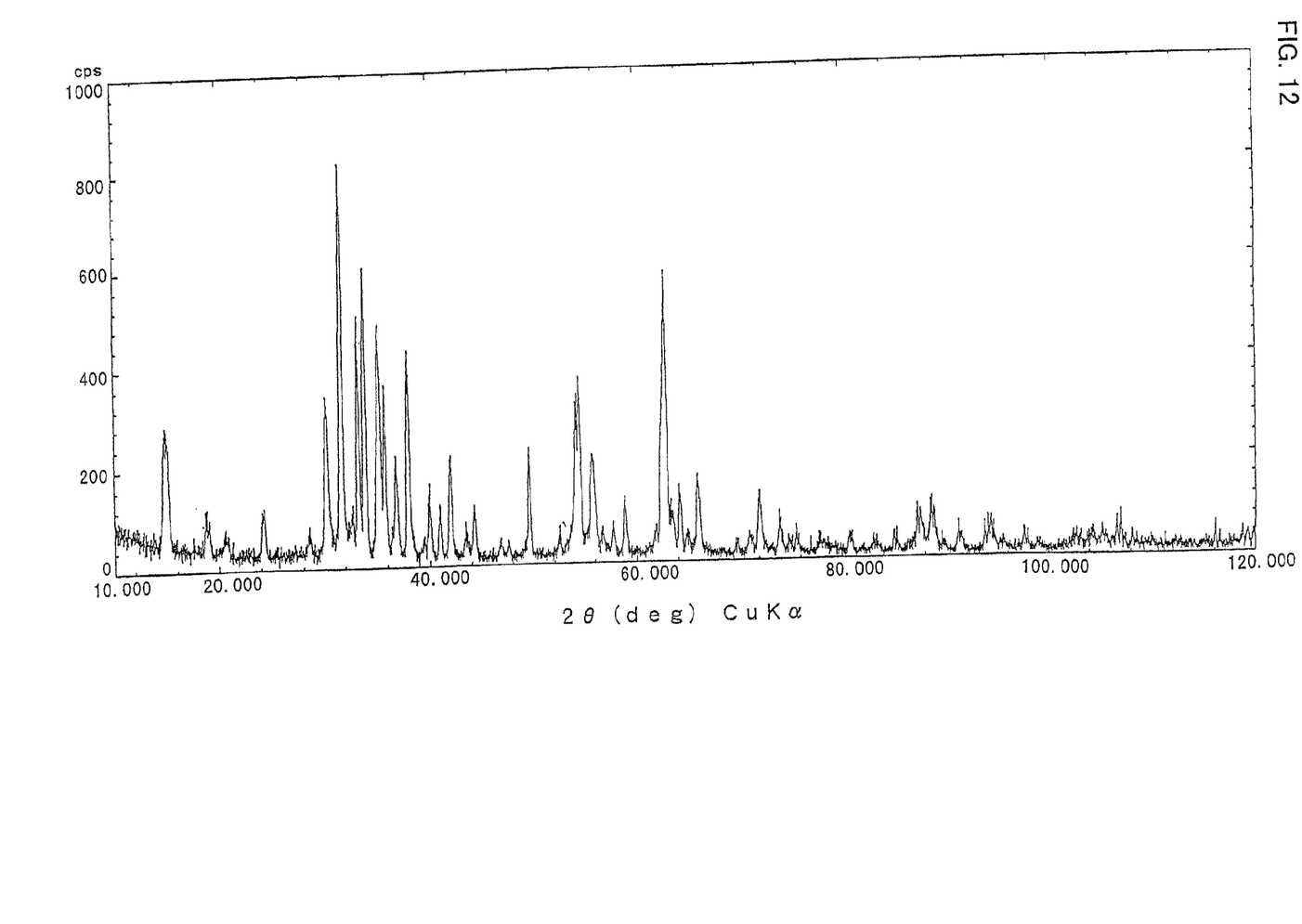
FIG. 12 is an x-ray diffraction chart of an iron oxide powder of a comparative example.
Figure 13:
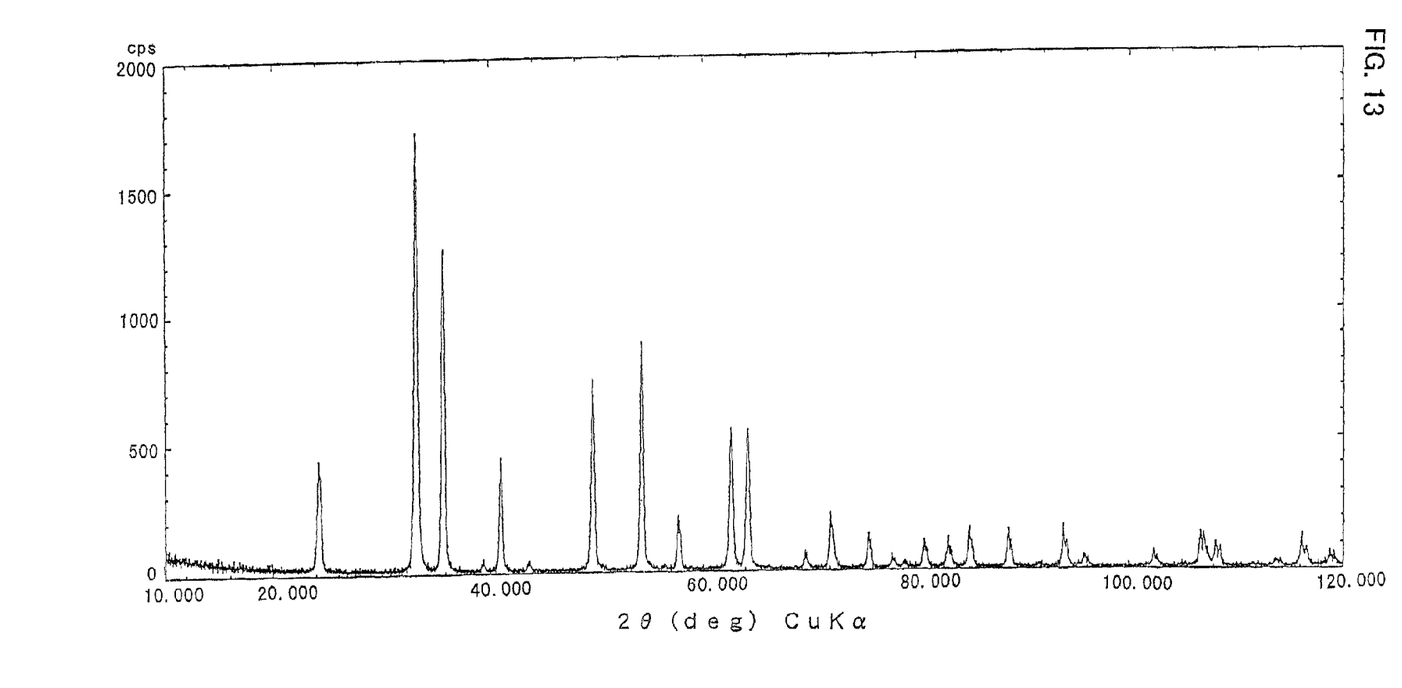
FIG. 13 is an x-ray diffraction chart of an iron oxide powder of a comparative example.
Figure 14:
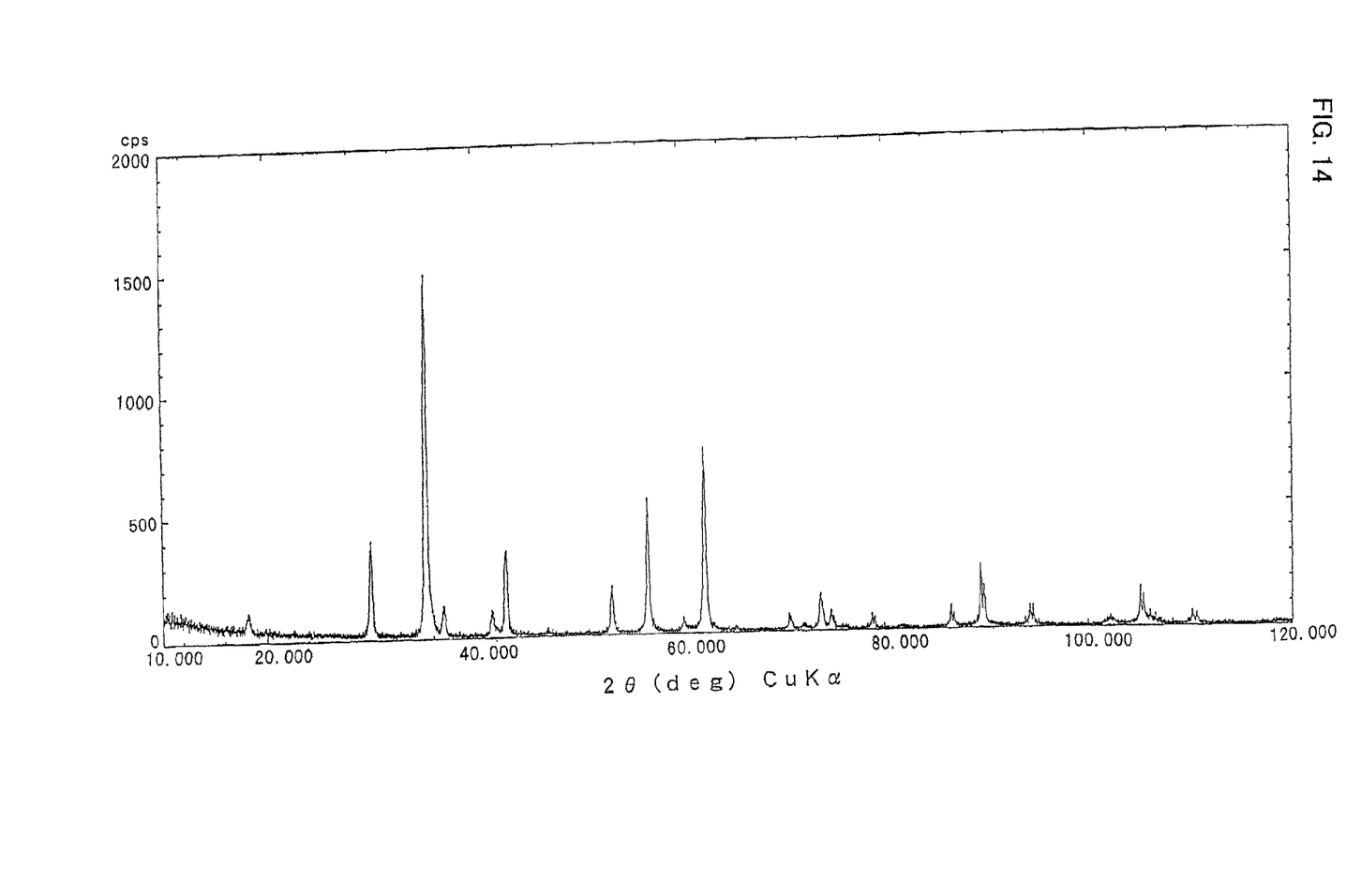
FIG. 14 is an x-ray diffraction chart of an iron oxide powder of a comparative example.

Next, the crystallinity of the respective thin films was evaluated by x-ray diffraction. The x-ray diffraction results of thin films formed on silicon (Si) wafers under the same conditions as those of Examples 1, 7 and 9 were shown in FIG. 9 (Example 1), FIG. 10 (Example 7) and FIG. 11 (Example 9). The x-ray diffraction results of the $K_{1.4}Fe_{11}O_{17}$ powder (FIG. 12), the $Fe_2O_3$ powder (FIG. 13) and $Fe_3O_4$ (FIG. 14) employed in Comparative Examples 1 and 2 were also shown together.

Figure 9:
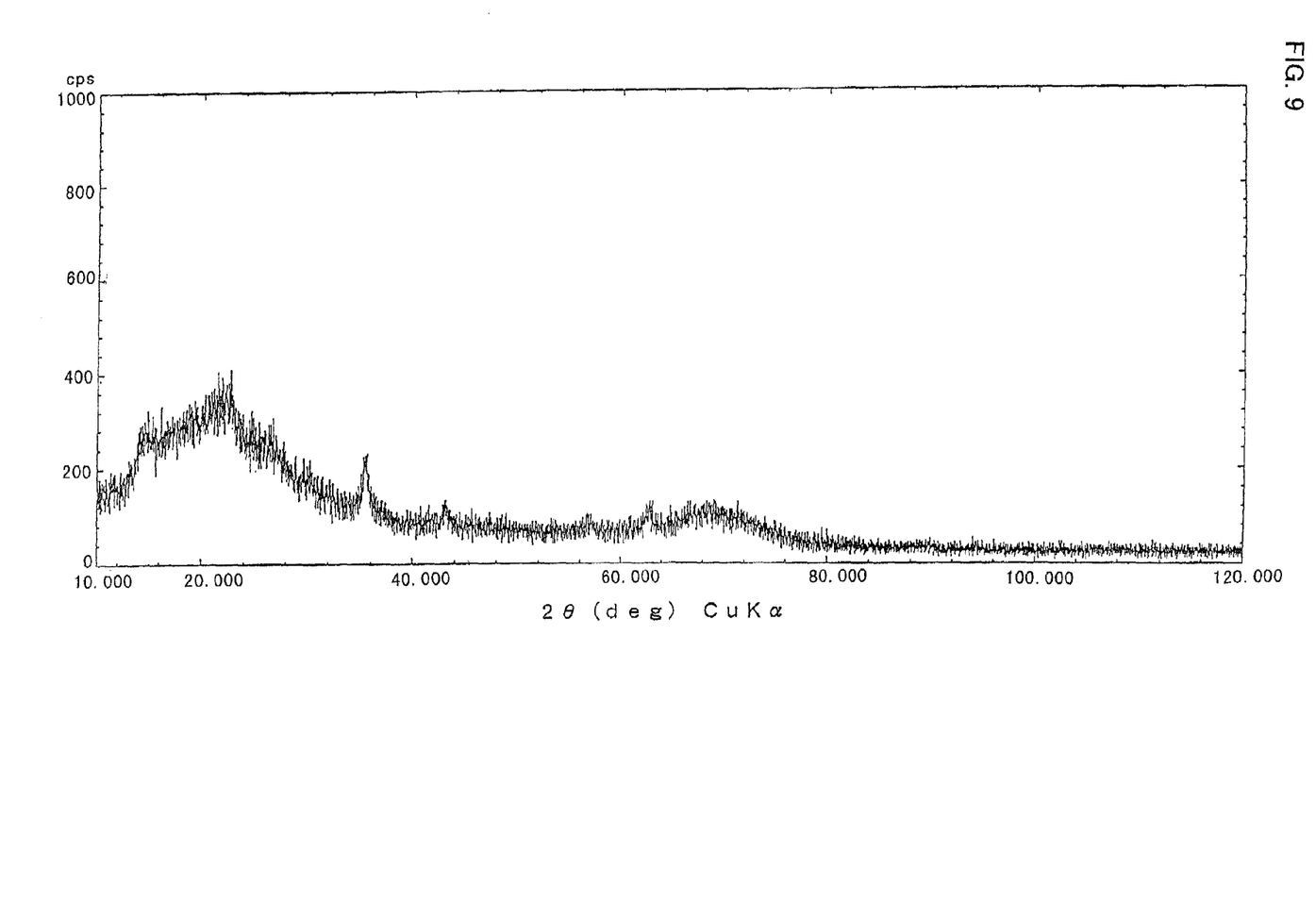
FIG. 9 is an x-ray diffraction chart of a thin film of an example of the present invention.
Figure 10:
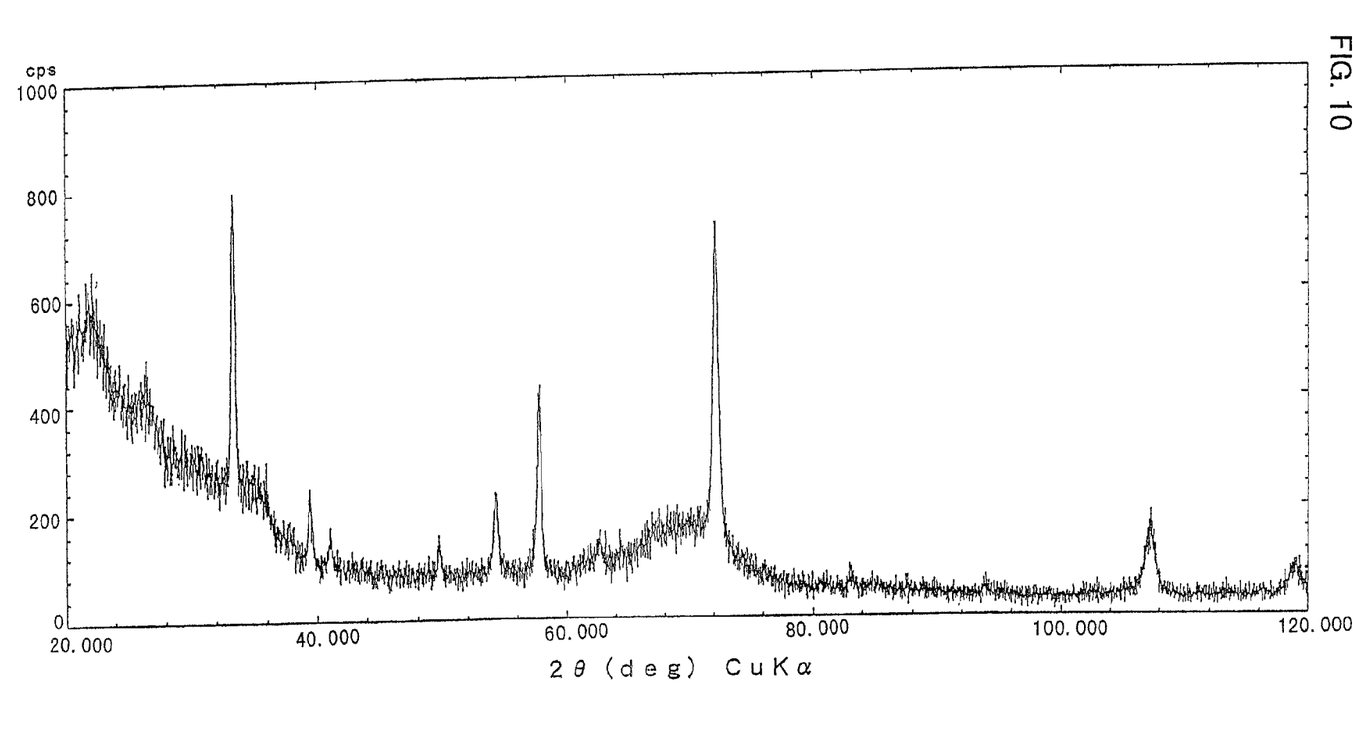
FIG. 10 is an x-ray diffraction chart of a thin film of an example of the present invention.

In comparison of these figures, although amorphous constituents were also outstanding in FIG. 9 and FIG. 10, some diffraction peaks were observed to make it clear the films were crystalline films. Further, from the positions of the peaks, the thin films of Examples 1, 7 and 9 were supposed to be thin films made of $Fe_2O_3$ or $Fe_3O_4$. However, since the peak positions of $Fe_2O_3$ and $Fe_3O_4$ were extremely close to each other, they could not be distinguished between them.

Further, from the result (FIG. 9) of the film produced by sputtering using the potassium-containing target, no peak of KO, KFeO and the like was observed.

Figure 15:
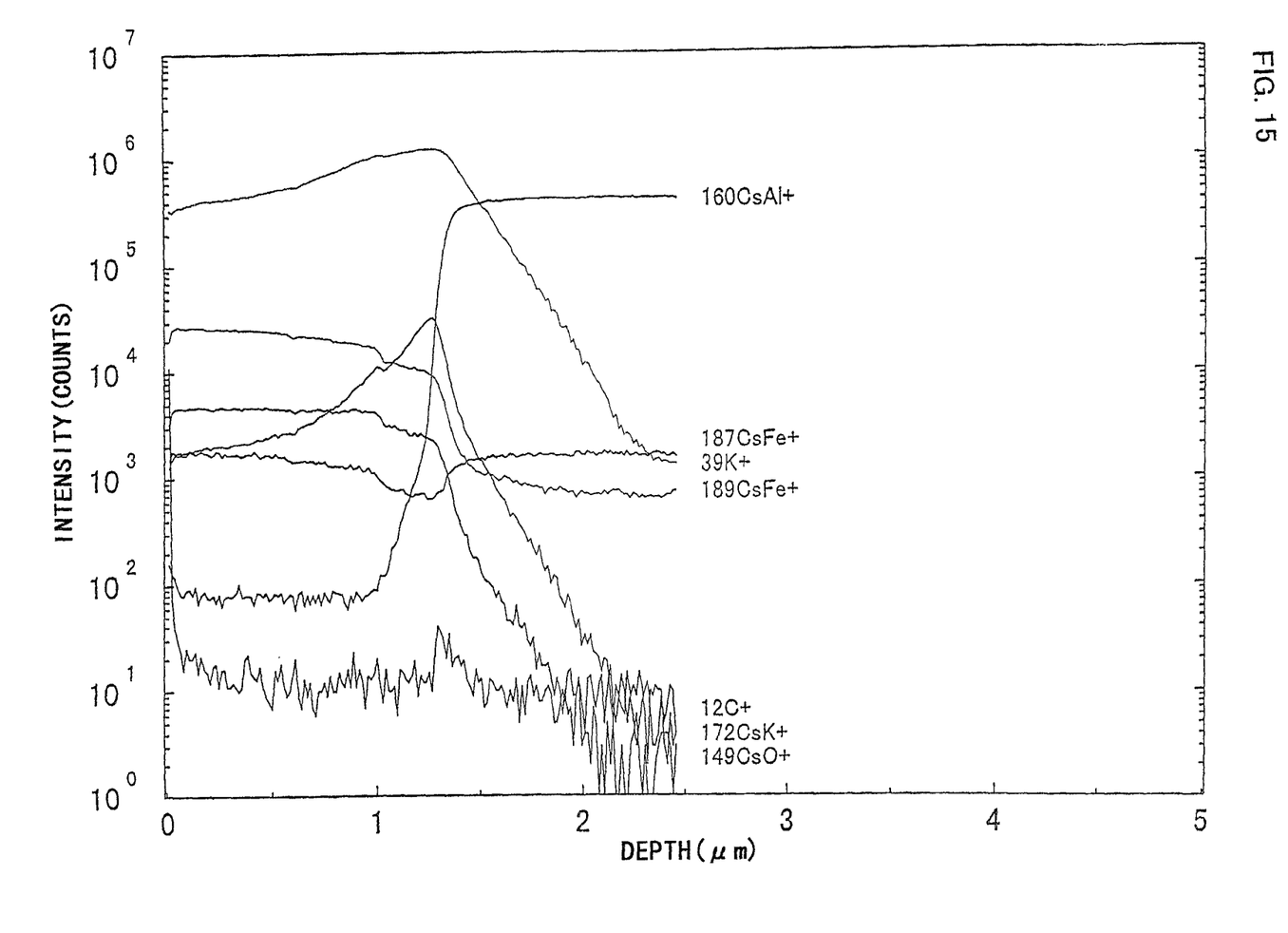
FIG. 15 shows the SIMS measurement results of a thin film of an example of the present invention.
Figure 16:
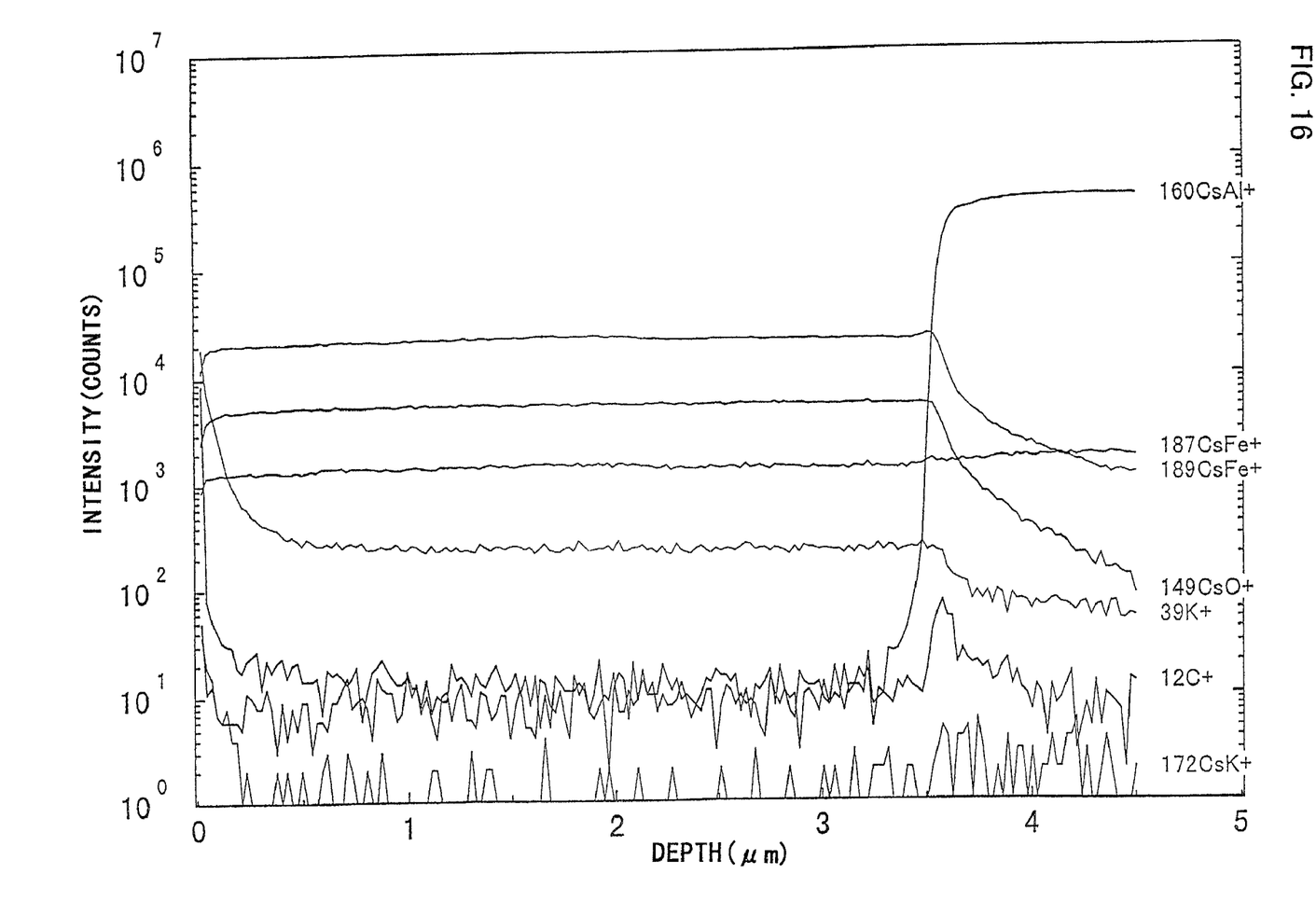
FIG. 16 shows the SIMS measurement results of a thin film of an example of the present invention.
Figure 17:
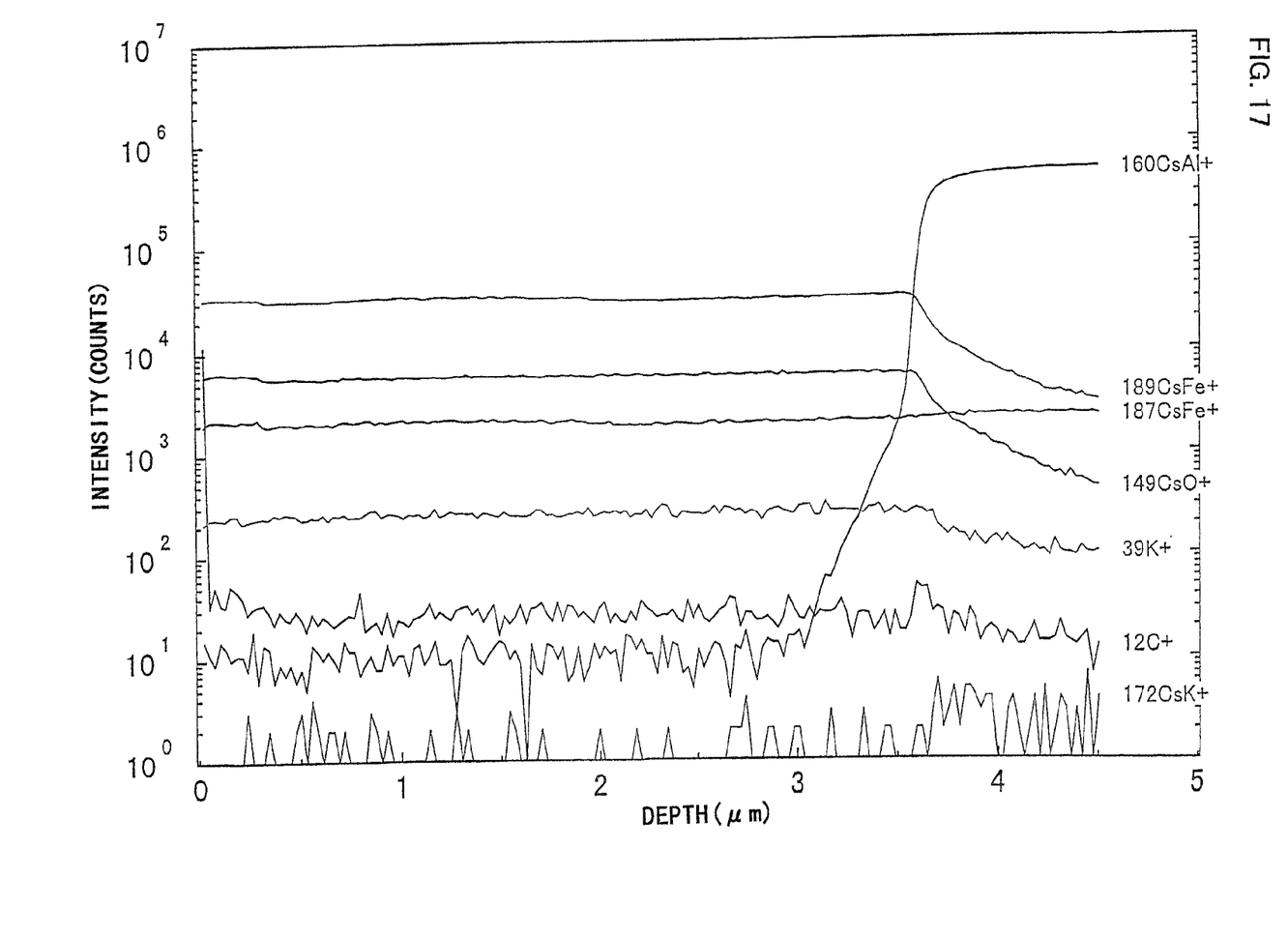
FIG. 17 shows the SIMS measurement results of a thin film of an example of the present invention.

Further, in order to carry out composition evaluation of the respective thin films, SIMS analysis was carried out. The results of thin films produced in Examples 1, 7 and 9 were shown in FIG. 15 (Example 1), FIG. 16 (Example 7) and FIG. 17 (Example 9), respectively. From the results, it was found that the iron and oxygen concentrations in the respective thin films were approximately constant. In Example 1 (FIG. 15) in which the film is produced by sputtering using the potassium-containing target, it is found that potassium exists in the thin film. Further, it is found that the distribution of potassium is gradually decreasing from the interface toward the surface. In addition, in Example 9 (FIG. 17), the film formed by the reactive deposition while oxygen ion beam being radiated, has a widened distribution of aluminum (the substrate constituent) in the vicinity of the interface, as compared with the thin film (FIG. 16) of Example 7 formed without ion beam radiation, and consequently it is found that ion radiation promotes the mutual diffusion.

In the above-described examples, the sputtering method and the reactive deposition method were described as the film-forming methods, however even in the case where a positive electrode is produced by forming a thin film of an iron oxide by another film-forming method, e.g. a vacuum deposition method, a chemical vapor deposition method, a spraying method, a plating method and the like, it is possible to produce a lithium secondary battery similarly excellent in charge-discharge cycle characteristics.

According to the present invention, a lithium secondary battery with a high discharge capacity and excellent in charge-discharge cycle characteristics can be provided.

What is claimed is:

1. A lithium secondary battery comprising a negative electrode containing lithium metal or a material previously storing lithium as an active material, a positive electrode containing a positive active material, and an electrolyte containing a non-aqueous electrolyte solution, wherein said positive active material is a thin film formed by depositing on a substrate from vapor phase and including an oxide containing at least iron as a main constituent and wherein said substrate constituent and a constituent of said thin film are mutually diffused in the interface of said substrate and said thin film.

2. The lithium secondary battery according to claim 1, wherein said thin film contains a crystal of $Fe_2O_3$ or $Fe_3O_4$.

3. The lithium secondary battery according to claim 1, wherein said thin film has columnar structure extended substantially in the vertical direction to the substrate.

4. The lithium secondary battery according to claim 1, wherein said film-forming method is a sputtering method, a reactive deposition method, a vacuum deposition method, a chemical vapor deposition method, or a method in combination of these methods.

5. The lithium secondary battery according to claim 1, wherein said oxide containing iron contains potassium.

6. The lithium secondary battery according to claim 5, wherein the concentration of said potassium is gradually decreased as closer to the surface from the substrate in the thickness direction.

7. The lithium secondary battery according to claim 5, wherein said oxide containing iron and potassium further contains carbon.

8. The lithium secondary battery according to claim 1, wherein said substrate has electron conductivity.

9. The lithium secondary battery according to claim 8, wherein said substrate is made of a metal or an alloy.

10. The lithium secondary battery according to claim 9, wherein said substrate is made of aluminum or an aluminum alloy.

11. A positive electrode for a lithium secondary battery formed by depositing a thin film of an active material on a current collector from vapor phase, wherein said thin film includes an oxide containing at least iron as a main constituent and wherein said substrate constituent and a constituent of said thin film are mutually diffused in the interface of said substrate and said thin film.

12. The positive electrode for the lithium secondary battery according to claim 11, wherein said thin film contains a crystal of $Fe_2O_3$ or $Fe_3O_4$.

13. The positive electrode for the lithium secondary battery according to claim 11, wherein said thin film has columnar structure extended approximately in the vertical direction to said substrate.

14. The positive electrode for the lithium secondary battery according to claim 11, wherein said oxide containing iron contains potassium.

15. The positive electrode for the lithium secondary battery according to claim 14, wherein the concentration of said potassium is gradually decreased as closer to the surface from the substrate in the thickness direction.

16. The positive electrode for the lithium secondary battery according to claim 14, wherein said oxide containing iron and potassium further contains carbon.

17. The positive electrode for the lithium secondary battery according to claim 11, wherein said film-forming method is a sputtering method, a reactive deposition method, a vacuum deposition method, a chemical vapor deposition method, or a method in combination of these methods.

* * * * *